R. A. LOCKE

3,091,387

CARRIAGE PROGRAMMING SYSTEM

Filed May 31, 1961

United States Patent Office 3,091,387
Patented May 28, 1963

3,091,387
CARRIAGE PROGRAMMING SYSTEM
Robert A. Locke, Easton, Conn., assignor to Sperry Rand Corporation, New York, N.Y., a corporation of Delaware
Filed May 31, 1961, Ser. No. 113,777
12 Claims. (Cl. 234—13)

This invention relates to carriage programming systems and more particularly to a system for programming data output and form composition both horizontally and vertically within an electric typewriter.

In input installations for data handling systems, electric typewriters are provided which have a data output consisting of control and coded input signals which can be utilized by paper tape perforators, card punches or any other device requiring control functions. These coded signals specify the form composition including both the columnar and the vertical spacing of the data being typed on the typewriter. In many situations it is desirable that the system be capable of programming the entire form automatically.

As an example, it may be desirable to use the system to type information onto a form and have the typewriter control a paper tape punch which punches codes representative of the data typed and also representative of the horizontal and vertical spacing of the data on the form. In typing a specified form it may be desirable to type certain information into a number of horizontal spaces on a line, then to have the typewriter carriage tabulate out of this position to another position at which further information is typed. That is, it is desirable to type the information into a specified horizontal format for a particular line. When the end of this line is reached it may be desirable to automatically initiate a carriage return operation and type a second line which has a different horizontal program or format. It is desirable to type the entire form with each line being automatically programmed in accordance with the desired format for that line. In addition to the automatic initiation of horizontal and vertical spacing functions, it may be further desirable to initiate other functions at specified positions in the typing of the form. For example, one particular part of the form may call for the typing of information which is not to be punched into paper tape. At this position in the form, therefore, it is desirable to initiate a control signal which would turn off the punch. Further, it would be desirable to initiate another control signal to turn the punch on again when this position in the form is passed. There are numerous other functions which should be initiated automatically in the typing of a form.

Accordingly, it is an object of the present invention to provide complete automatic programming, both horizontal and vertical, of the typing and punching of an entire form.

It is a further object of the present invention to provide a carriage programming system having a large capacity for the automatic initiation of various control functions.

It is a further object of the present invention to provide simple initiation of carriage position signals in an automatic carriage programming system.

It is a further object of the present invention to completely eliminate operators' decisions from the initiation of typewriter and output equipment signals in a carriage programming system.

In accordance with one embodiment of the invention, the system includes four major sections. The first section is a printed circuit board which is fastened to the typewriter frame and which is brushed by a single commutator movable with the typewriter carriage. This single commutator provides a signal indicative of the horizontal position of the carriage. The second major section is a plugboard including a plurality of neon elements used as isolating devices and used to interconnect the printed circuit board with the other basic sections of the system. The third section includes a stepping switch, which is movable with the vertical line feed of the typewriter, and a plurality of program relays, the actuation of which initiates a particular program on a particular line of the typing. The fourth section includes a number of cold cathode amplifying tubes used to initiate each typewriter function or output control function.

From any horizontal position of the typewriter carriage a ground connection is completed when the single commutator contacts a particular printed circuit contact. This ground control signal is channeled through the plugboard and associated neon and through a program selector relay to the starter circuit of the appropriate function tube. The function tube, upon firing, produces voltage for the prescribed function. The tube will conduct only momentarily for the time needed to energize the function actuator or relay involved. The ground connection from the printed circuit may be channeled to different function initiating relays by the operation of the stepping switch which determines the particular program line setup.

A better understanding of my invention, together with further objects and advantages thereof, may be better understood from the following description and appended claims taken in conjunction with the drawings, in which:

Figure 1A:
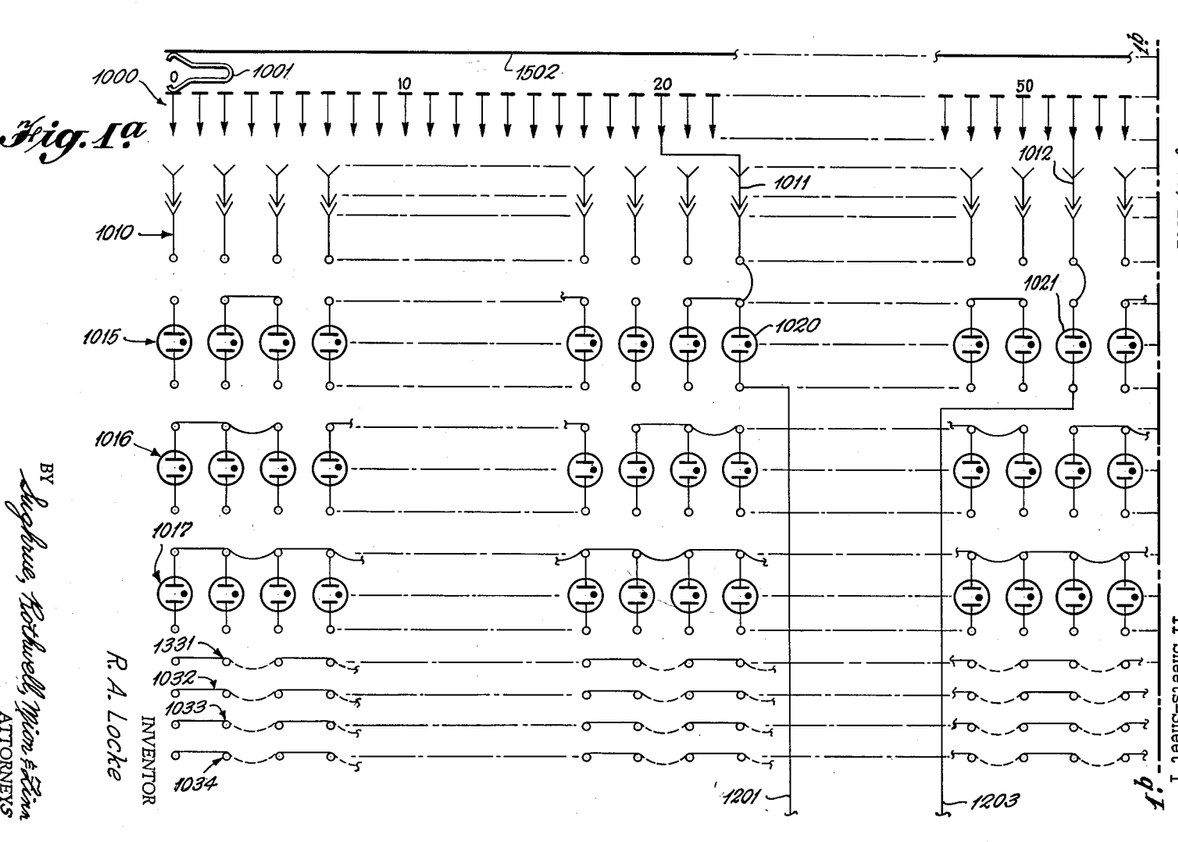
FIGURE 1 shows the printed circuit, single commutator and a portion of the plugboard.
Figure 1B:
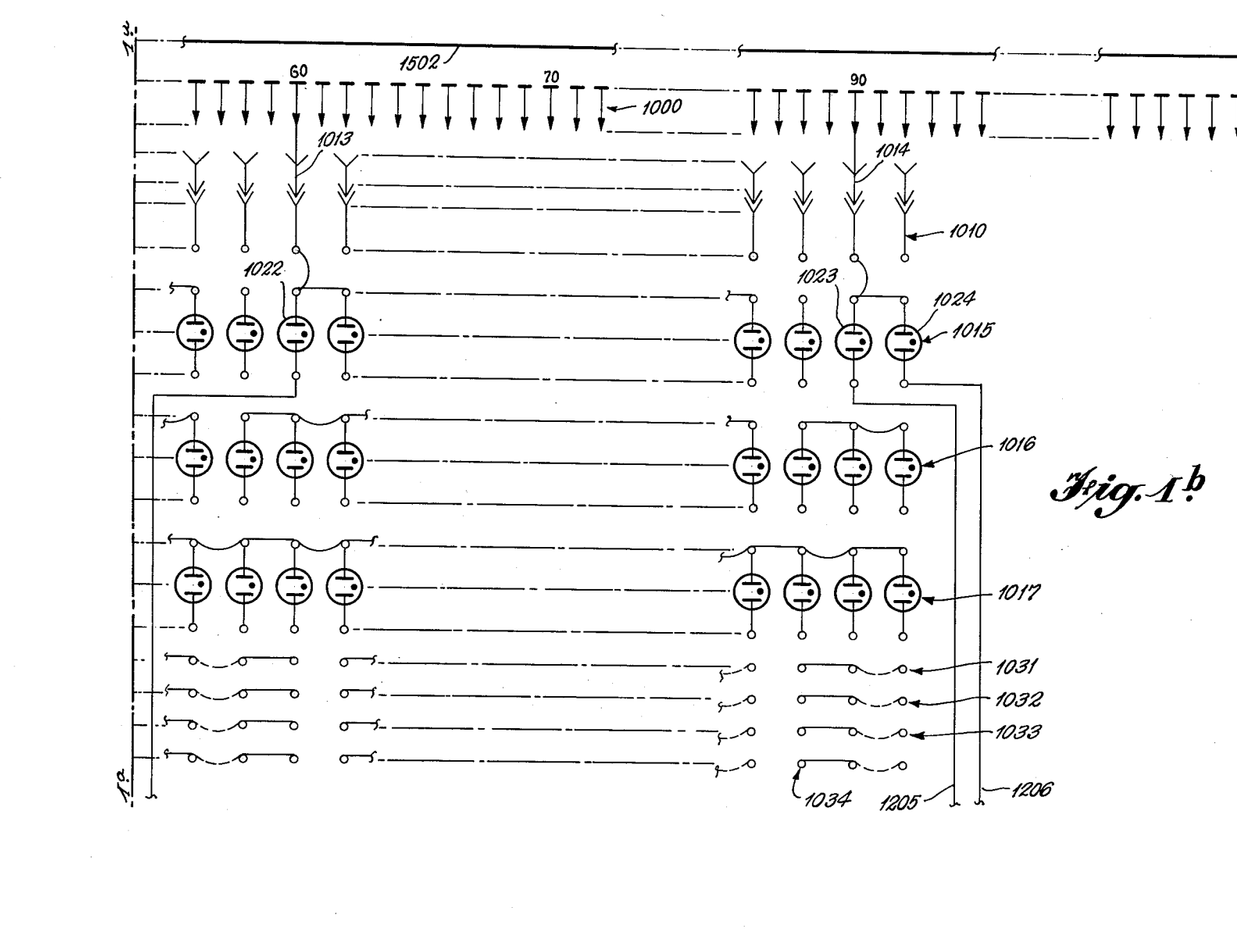

In the following description a particular number system is adapted for the leads which interconnect the circuitry shown on various drawings. The first numeral designates the drawing on which the lead appears. The second numeral designates the drawing to which the lead extends. And the third and fourth numerals designate the particular lead. As an example, the lead 1201 appears on FIGURE 1. This lead extends to FIGURE 2. The same lead is shown on FIGURE 2 with the designation 2101 indicating that the lead appears on FIGURE 2, it extends to FIGURE 1 and it is the 01 lead. The leads extending from one portion of the same figure to another, for example from FIGURE 1a to FIGURE 1b, are not so numbered. However, these leads are drawn so that they match when the figures are adjacent one another.

The first numeral of the component designations indicates the drawing on which the component appears. For example, printed circuit 1000 appears on FIGURE 1.

PRINTED CIRCUIT AND COMMUTATOR; FIGURE 1

Referring to FIGURE 1, a printed circuit, designated generally 1000, is attached to the typewriter frame. This printed circuit is brushed by a single commutator 1001, which is movable with the typewriter carriage. The wiper 1001 successively makes contact with the contacts 0–140 on the printed circuit. These contacts are evenly spaced along the typewriter frame so that the wiper 1001 is in contact with contact 0 when the typewriter carriage is at the extreme right-hand margin and the wiper 1001 is in contact with the contact 140 when the typewriter carriage is at the extreme left-hand margin. The wiper 1001 applies ground potential to each of the contacts as the carriage moves from margin-to-margin. This ground potential is fed to the wiper over the lead 1502. This ground potential is present only when certain interlocks are closed indicating that the typewriter is available for operation.

PLUGBOARD; FIGURE 1

A plugboard is provided to interconnect the printed circuit board with the other sections of the system. This plugboard includes a row of plugs 1010 which are adapted to be connected to various contact positions on the printed circuit. For purposes of simplicity, only four contact positions on the printed circuit board are shown wired into the plugboard. Position 20 on the printed circuit is wired to plug 1011, position 50 is wired to plug 1012, position 60 is wired to plug 1013, and position 90 is wired to plug 1014. It should be understood that, in actual practice, many of the contact positions on the printed circuit board will be wired and there will be many more connections from the contacts on the printed circuit to the row of plugs 1010.

The plugboard also contains three rows of neon devices. These neons are used to isolate the various contacts. In the embodiment shown the plug 1011 is wired to the neon 1020, the plug 1012 is wired to the neon 1021, the plug 1013 is wired to the neon 1022, and the plug 1014 is wired to the neon 1023 and to the neon 1024. The latter connection is a good example of a situation in which the need arises for the neon isolating devices. In this case it is desired to wire position 90 on the printed circuit board to two different program relays. Therefore, the contact 90 on the printed circuit is wired through neon 1023 and over line 1205 to one of the program relays. The contact position 90 on the printed circuit board is also connected through neon 1024 and over line 1206 to the other program relay. The neons effectively isolate one program relay from the other which is connected to the same printed circuit contact.

The plugboard also includes rows of spare contacts 1031, 1032, 1033, and 1034. Thes spare contacts are used to interconnect various printed circuit contacts as required by the particular program set up.

PLUGBOARD AND STEPPING SWITCH; FIGURE 2

Figure 2B:
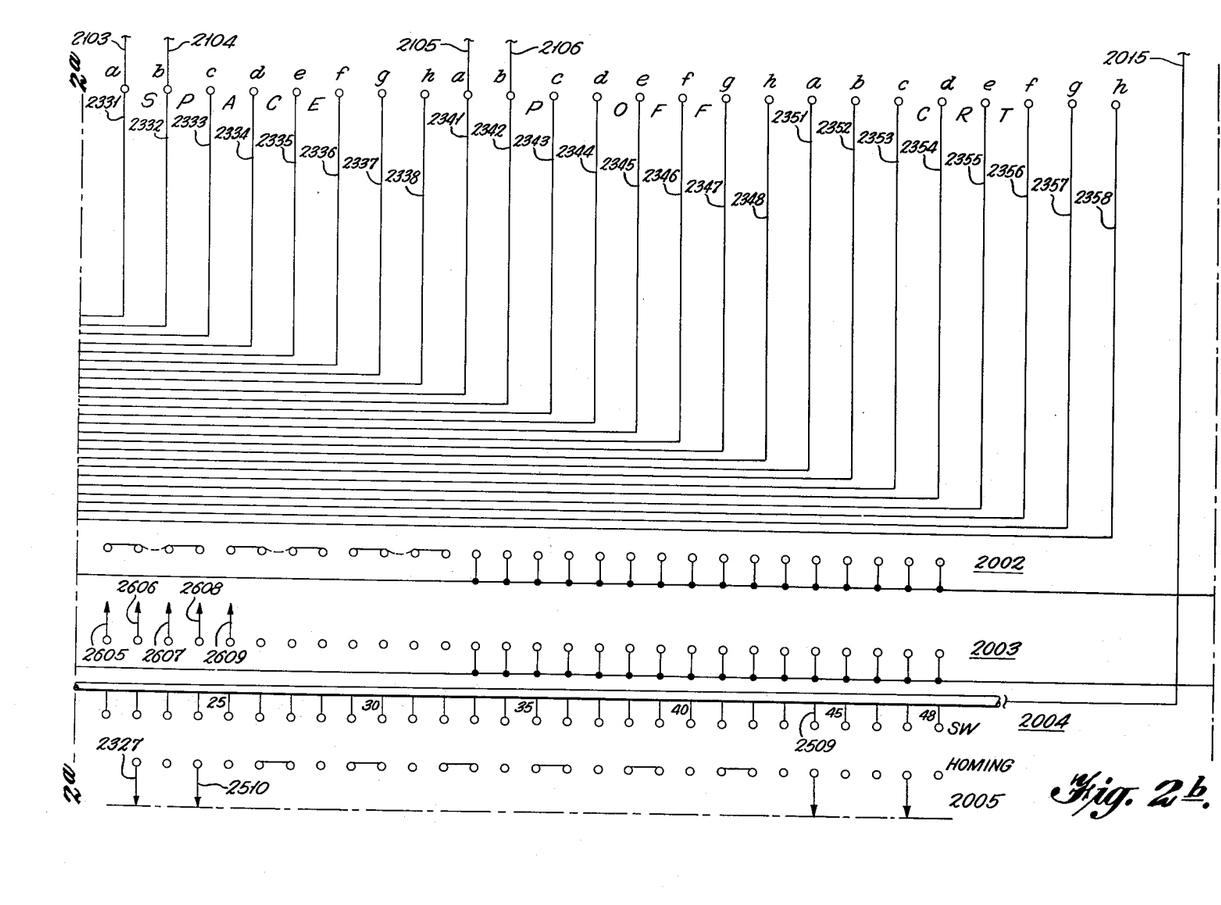
FIGURE 2 shows a portion of the plugboard and the stepping switch.
Figure 2C:
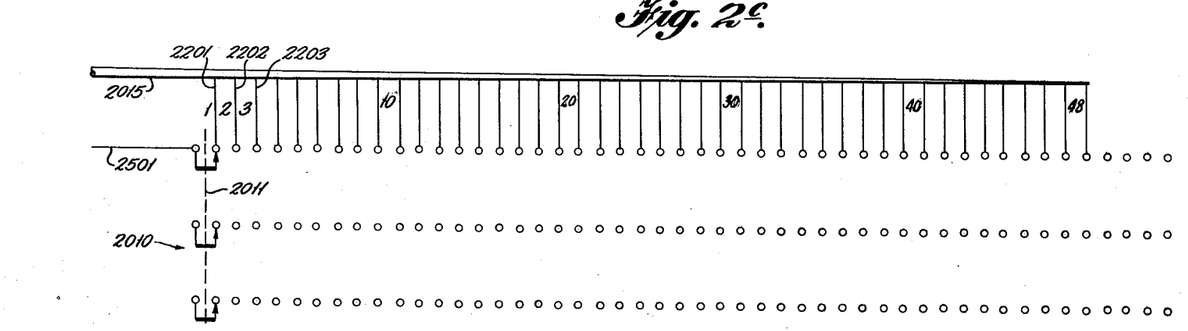

Referring now to FIGURES 2a and 2b, there is shown a continuation of the plugboard. A row of contacts 2001 is provided to interconnect the neons with various program switches.

Starting from the left, the first contact designated a is connected over the lead 2301 and the lead 3201 to the Non-Coded Space contact of the Program relay a. The terminal marked b is connected over the lead 2302 and 3202 to the Non-Coded Space contact of the Program relay b. The next contact marked c is connected over the lead 2303 and the lead 3203 to the Non-Coded Space contact of the Program relay c. The contact d is connected over the line 2304 and the line 3204 to the Non-Coded Space contact of the Program relay d. The connection is similar for the first eight terminals from the left of the row of contacts 2001. The next eight contacts, a–h, and designated TAB, are each individually connected to the corresponding one of the TAB contacts of the Program relays a–h in FIGURE 3. The remainder of the contacts in row 2001 are connected to program relays in FIGURE 3 as indicated.

Rows of contacts 2002 and 2003 are provided to accommodate the wiring of a vertical program.

In order to wire up a vertical program, a row of contacts 2004 is adapted to be selectively wired to a row of contacts 2005. Each of the contacts in the row 2004 is connected to one of the contacts of the stepping switch 2010 shown in FIGURE 2c. A gang contact 2011 on this stepping switch moves with the line feed of the typewriter. That is, as the typewriter roller moves from line 1 to line 2, the contact 2011 moves from position 1 to position 2. As the contact moves from line-to-line, ground potential from the line 2501 is connected to each of the contacts on the switch 2010. The contact 1 of the stepping switch 2010 is directly connected over line 2201 to the contact 2022 of the row of contacts 2004. Similarly, the contact 2 of the stepping switch 2010 is directly connected over line 2202 to the contact 2023 of the row of contacts 2004. Each of the 48 contacts in the stepping switch 2010 is connected to one of the terminals in the row of terminals 2004. This connection is indicated diagrammatically by the bus 2015. The terminals in the row 2004 are adapted to be selectively wired to the contacts in the row 2005.

Figure 3:
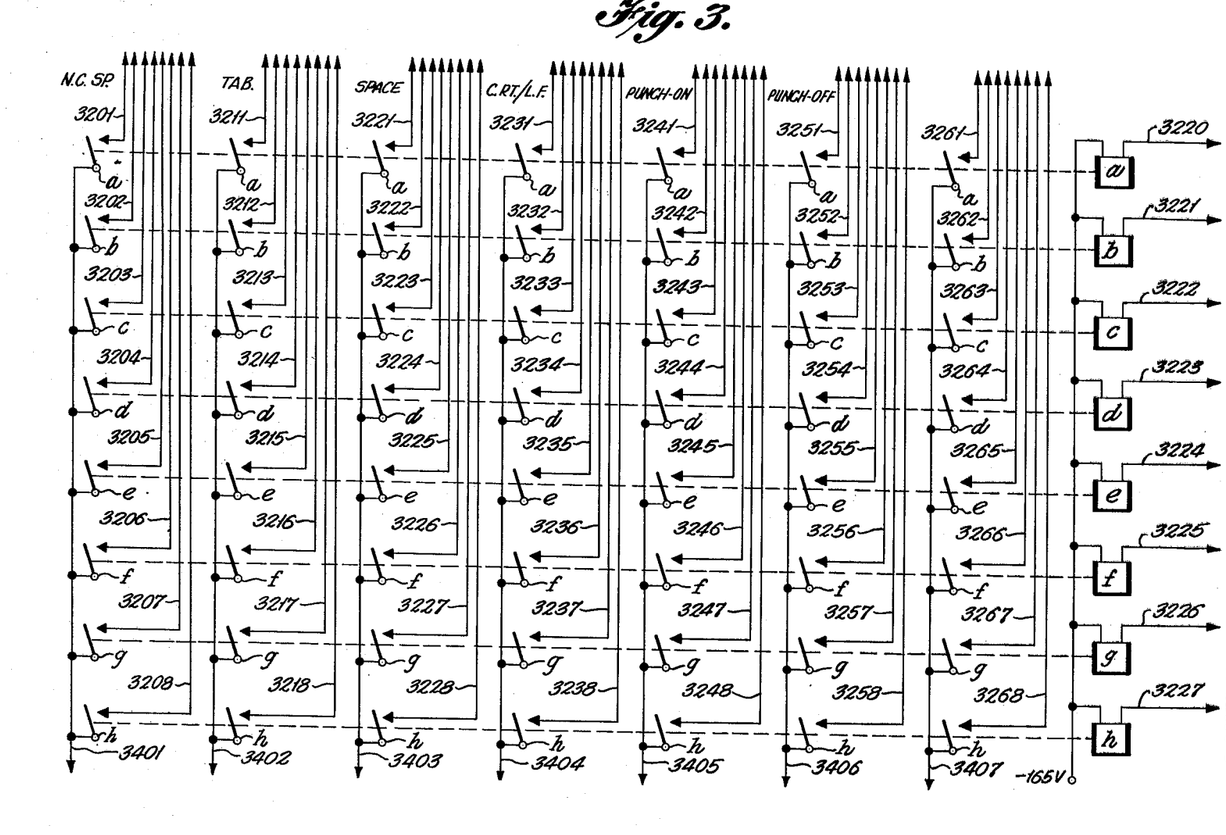
FIGURE 3 shows the program relays.

PROGRAM RELAYS; FIGURE 3

The contacts in the row 2005 are connected to the program relays. Terminal 2020 is connected over the lines 2320 and 3220 to Program relay a; contact 2021 is connected over lines 2321 and 3221 to Program relay b; and so on. By selectively connecting certain of the terminals in the row 2004 to certain of the terminals in row 2005, the program that is to be performed on a particular line may be determined. In the example shown, the terminal 2022 is directly connected to the terminal 2020. Therefore, when the stepping switch 2010 is on contact position 1, indicating that line 1 is being typed, a ground potential is connected over line 2501, the contact 1 in the stepping switch 2010, the line 2201, the contact 2022, the contact 2020, over line 2320 and line 3220 to Program relay a, thus energizing that relay. Similarly, direct connections from contacts 2023 and 2024 to the contact 2021 energizes Program relay b during the time that the typewriter is in line 2 and during the time that the typewriter is in line 3.

Figure 4:
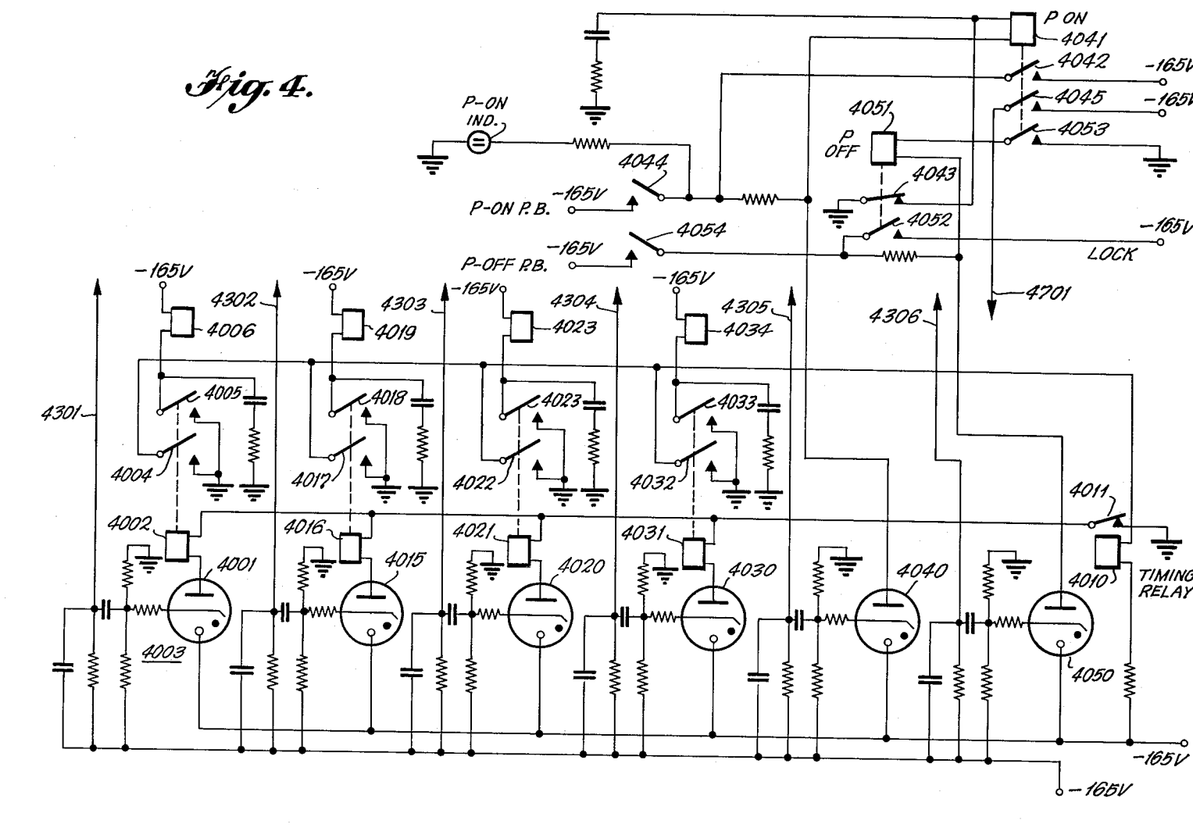
FIGURE 4 shows the cold cathode amplifiers and function initiating relays.

FUNCTION RELAYS; FIGURE 4

Referring to FIGURE 4, there are shown the cold cathode amplifiers which drive the function relays. Cold cathode amplifier 4001 is provided to drive the Non-Coded Space function relay 4002. Cold cathode tube 4001 is fired by the application of ground potential from one of the program relay contacts over line 4301 to the resistor capacitor combination indicated generally as 4003. Resistor capacitor combination 4003 is connected to the grid of the cold cathode tub 4001 and application of ground potential on line 4301 causes the tube to fire. Firing of cold cathode tube 4001 energizes relay 4002, thus closing the timing contacts 4004 and the main contacts 4005. Closing of the contacts 4005 completes a circuit through the magnet 4006. Energization of magnet 4006 actuates the space mechanism of the typewriter. Since this is a non-coded space, the space mechanism is actuated so as not to punch the space code into the output.

Closing of the timing contacts 4004 completes a circuit to energize the timing relay 4010. This relay is provided in order to turn off the cold cathode amplifiers once they have been fired. Energization of this relay, which is slow acting, opens the contacts 4011, thus breaking the circuit to the plates of the cold cathode amplifier tubes.

In a similar manner, cold cathode amplifier 4015 is provided to energize the tab relay 4016. Energization of relay 4016 closes the timing contacts 4017 and the main contacts 4018. A circuit is completed through contacts 4018 to energize the magnet 4019 which actuates the tab mechanism in the typewriter.

Similarly, cold cathode amplifiers 4020, 4030, 4040, and 4050, as associated circuitry are provided to perform the Space, Carriage Return, Punch-On and Punch-Off functions, respectively. The circuitry associated with the Punch-On and Punch-Off functions differs from the other circuitry slightly. Means are provided to interlock the Punch-On and Punch-Off functions so that when one relay is energized, it is locked in and the other relay is put in condition to be energized by firing of its associated cold cathode tube. In order to perform this interlocking, the Punch-On relay 4041 is provided with a locking contact 4042. The Punch-On relay 4041 also closes a contact 4053 in the circuit of the Punch-Off relay 4051 in order to condition this relay for energization upon firing of the associated cold cathode amplifier 4051. Similar contacts are provided interlocking the Punch-Off relay with the Punch-On relay. Manual push buttons 4044 and 4054 are provided on the typewriter chassis to manually initiate the Punch-On or Punch-Off function.

Figure 5:
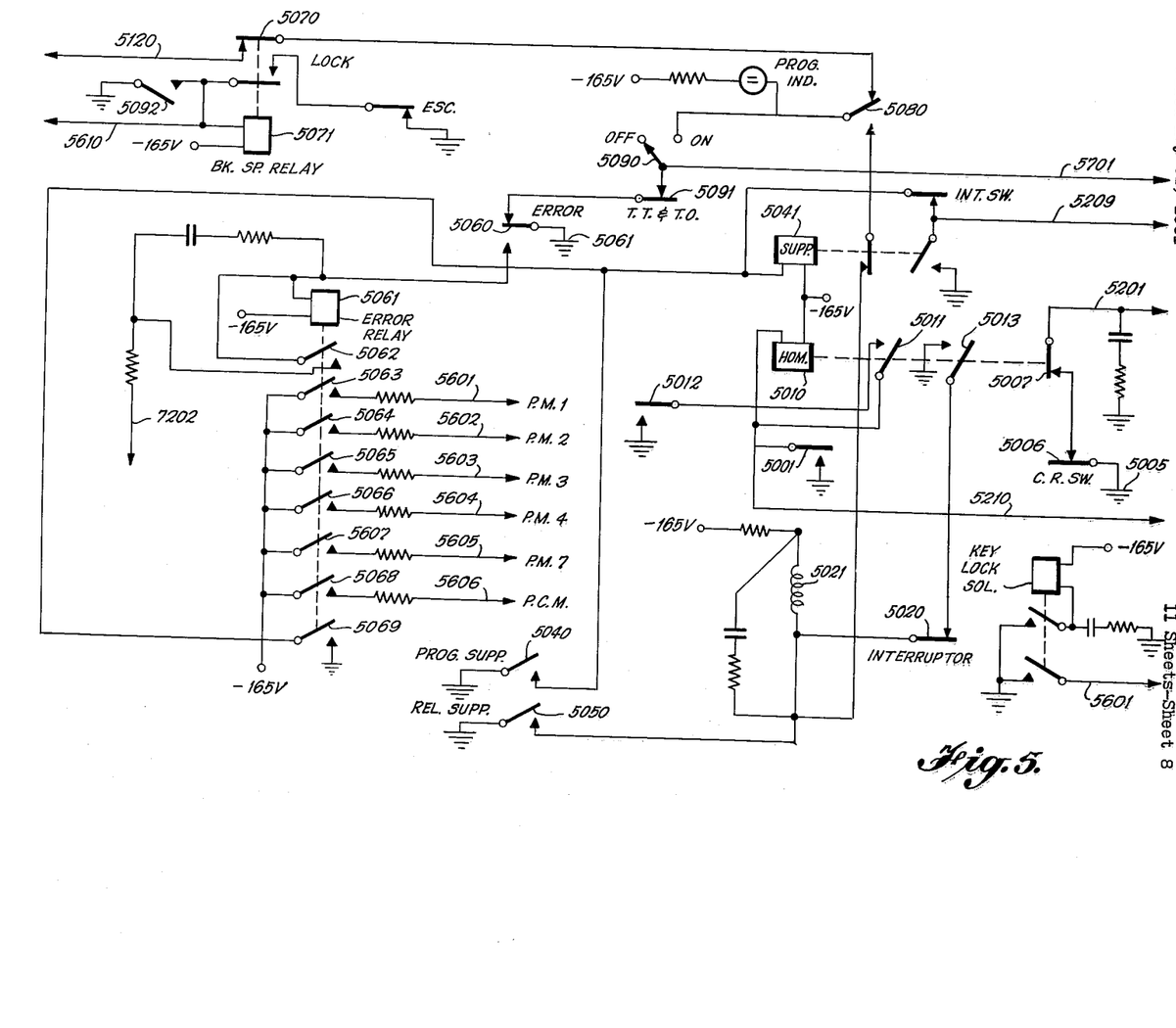
FIGURE 5 shows miscellaneous manual control switches.

MANUAL CONTROLS; FIGURE 5

Referring to FIGURE 5, there is shown circuitry for performing various auxiliary functions of the system. In order to rest the vertical programming of the typewriter, a manual program reset switch 5001 is provided on the typewriter keyboard. Closing this contact causes the typewriter line feed to step until the home position, that is, the first line of the program, is reached. The contacts of the program reset switch complete a circuit through the homing relay 5010. This relay is locked in through contacts 5011. The lock-in circuit is completed through a set of contacts 5012 which are closed at every line position of the carriage except the home position. Therefore, when the line feed reaches the home position, the contacts 5012 are opened, thus de-energizing the homing relay 5010.

Energization of the homing relay 5010 closes contacts 5013, thereby completing a circuit through interrupter contacts 5020 to the coil of the interrupter 5021. Current flow through the stepping switch coil 5021 causes one line feed and also opens the interrupter contacts 5020. As the current through coil 5021 subsides, interrupter contacts 5020 are again closed, thus completing a circuit to the stepping switch coil 5021 again. Successive line feeds continue until the home position is reached at which time homing relay 5010 is de-energized, contacts 5013 open and the line feed stops.

In order to suppress the vertical programming of the machine, a Manual Program Suppress contact 5040 is provided. Closing this switch completes a circuit to the Program Suppress relay 5041. When the Program Suppress contacts are closed, the machine continues to operate on the program on which it is presently operating for successive lines until a Release Suppress button 5050 is pressed. That is, if the machine is operating on Program a and the operator wishes to have the machine continue to operate on Program a for a number of succeeding lines, he merely pushes the Program Suppress button 5040. When the operator wishes the machine to continue on its normal program, he manually pushes the Release Suppress button 5050.

In order to manually indicate an error in the typing, a Manual Error switch 5060 is provided. Actuation of this switch energizes an Error relay 5061. The relay is locked in through its contact 5062. The relay contacts 5063—5068 are also closed by the error relay to energize punch magnets 1, 2, 3, 4 and 7, to punch an error code. Contacts 5069 are also closed by the error relay to energize the Suppress relay.

A manual Back Space key 5090 together with a Back Space relay 5071 is also provided. A manual switch 5080 on the keyboard controls the carriage return and a manual switch 5090 on the keyboard is set in accordance with whether the operator desires to operate on automatic program or manual format.

Figure 6A:
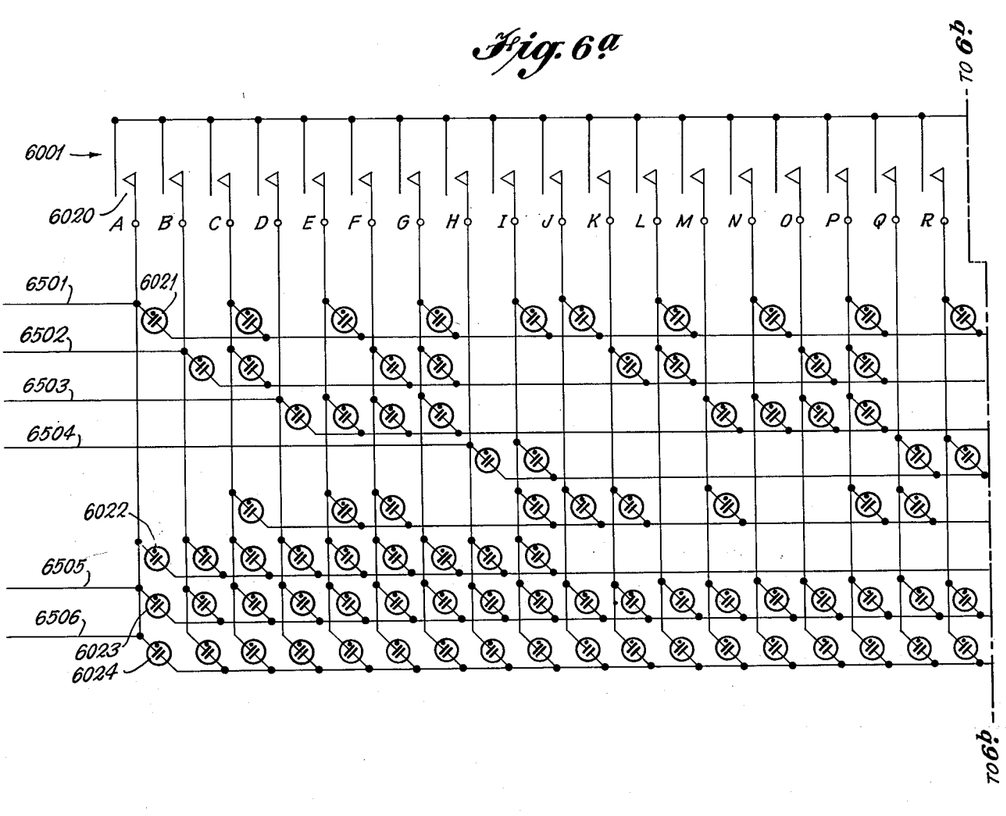
FIGURE 6 shows the typewriter keyboard and punch code matrix.
Figure 6B:
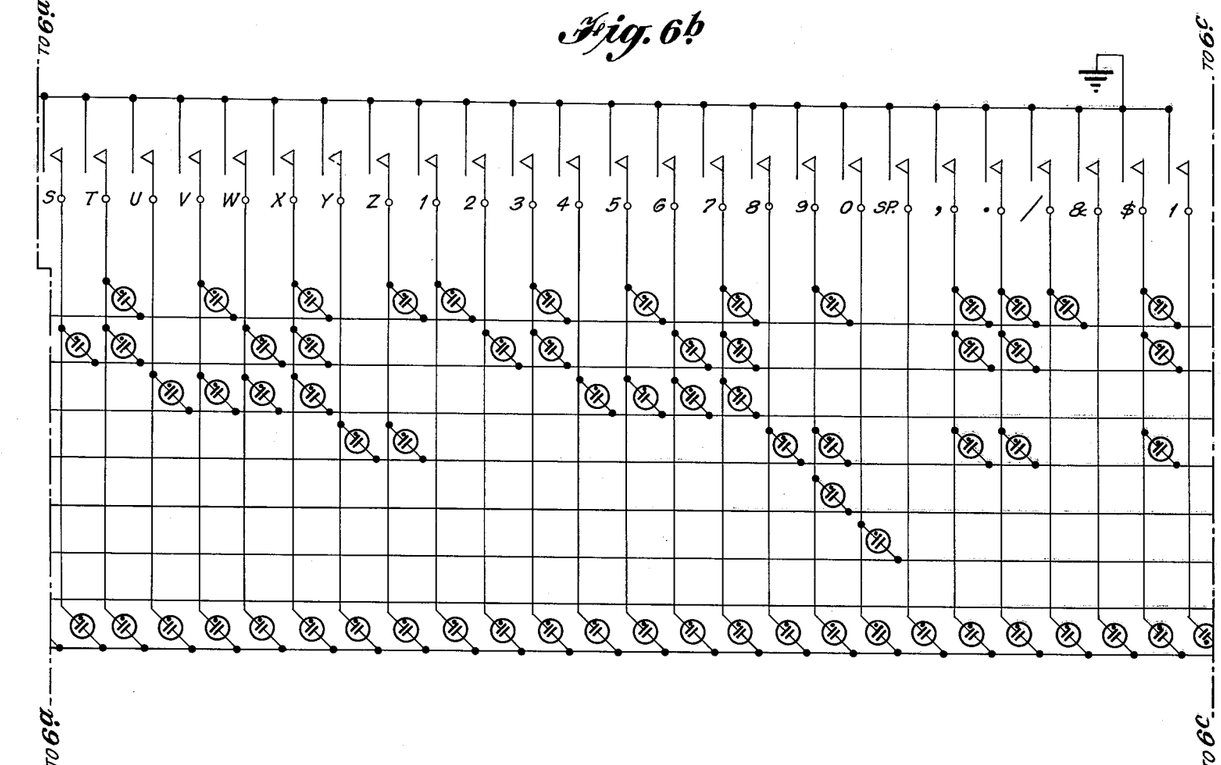

TYPEWRITER KEYBOARD AND CODE MATRIX; FIGURE 6

Referring to FIGURE 6, there is shown the typewriter keyboard 6001. Connected to the typewriter keyboard is a neon matrix used to interconnect the keyboard with the punch magnets.

Also shown on FIGURE 6 are a manual delete switch 6010 and a manual tape feed switch 6011.

Figure 7:
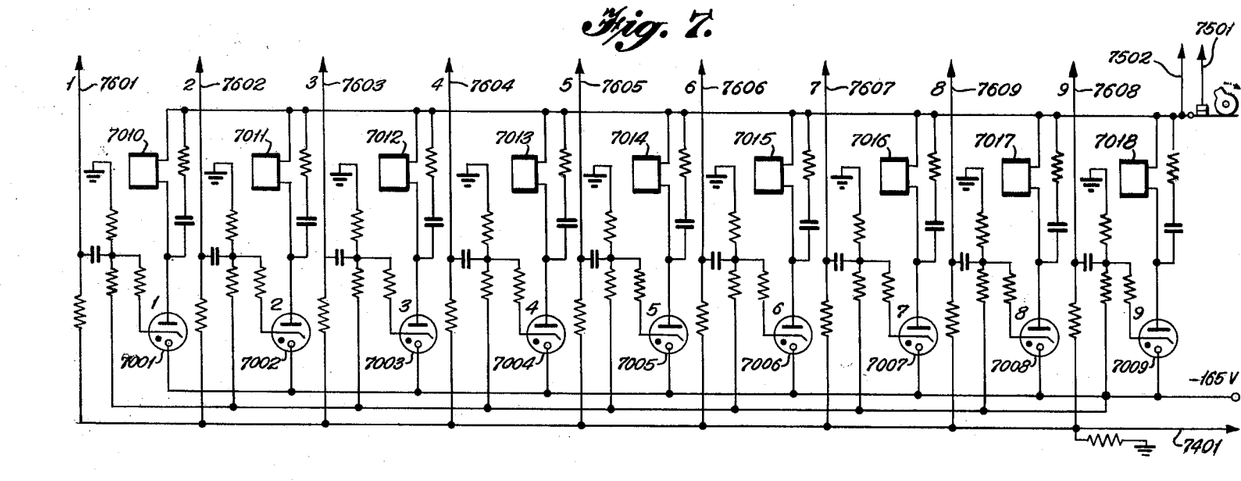
FIGURE 7 shows the data code punch magnets together with associated cold cathode amplifying tubes.

PUNCH MAGNETS; FIGURE 7

Referring to FIGURE 7, there are shown cold cathode amplifying tubes 7001—7009 which drive the punch magnets 7010—7017 and the punch clutch magnet 7018.

Briefly, the operation of the keyboard and punch magnets is as follows: When the A key 6020 is depressed, ground is applied to the neons 6021, 6022, 6023, and 6024. These neons fire and a positive pulse is applied to the grids of cold cathode tubes 7001, 7006, 7007, and 7009. These tubes energize the punch magnets 7010, 7015, and 7016, thus punching the A code into the tape. The cold cathode amplifier 7009 is also fired, thus energizing the punch clutch magnet 7018, thereby moving the tape one space.

Figure 6C:
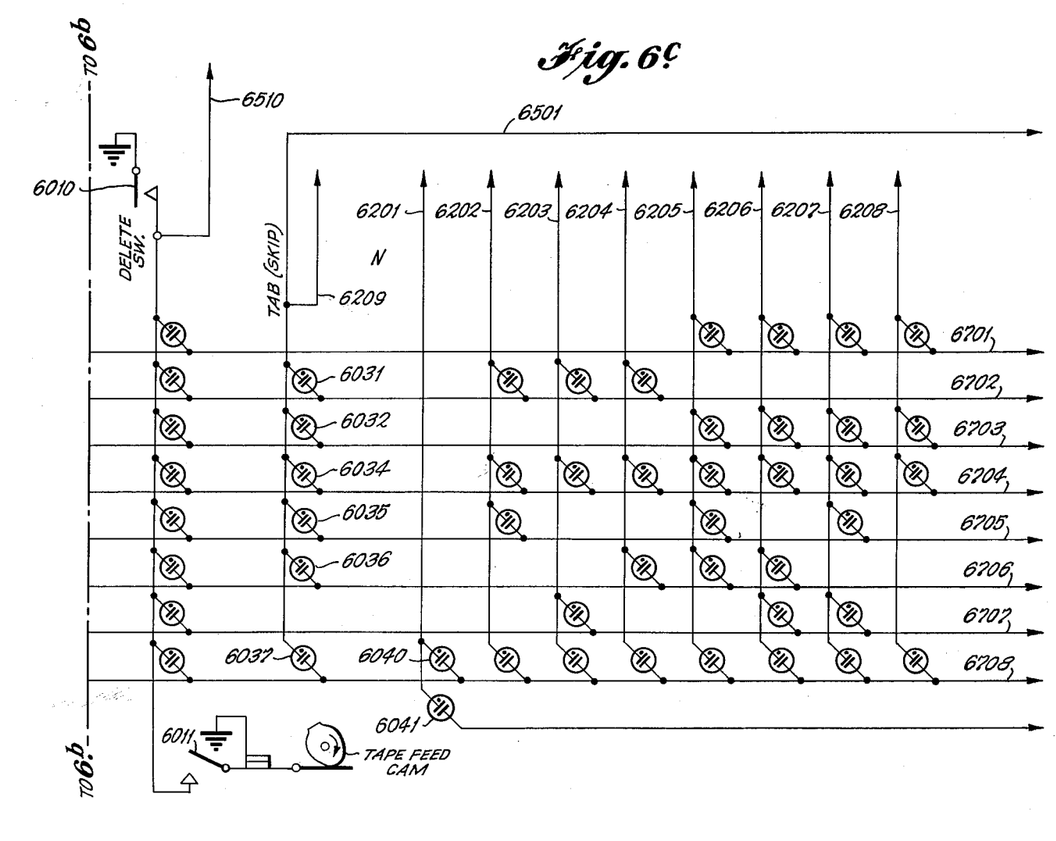

Also shown in FIGURE 6c are neons for energizing the punch magnets in special tape codes. For example, ground potential on line 6201 fires neons 6040 and 6041, thus energizing the punch magnet 8, 7017, which punches an End of Line code. Neon 6040 energizes the punch clutch magnet which is energized every time that a code is punched. The neon matrix for prescribing these special tape codes is wired to the plugboard and more specifically is wired to terminals in the row of terminals 2003. By connecting the desired terminals in row 2003 to the desired contacts on the printed circuit 1000, these special codes can be incorporated in the program.

Operation of Carriage Programming System

A very brief example of a program to be automatically performed by the subject system has been chosen for purposes of explanation. It will be understood of course that the system herein described can be wired to perform much more complicated programs.

The illustrative example is that during the typing of line 1, the typewriter types in the format specified by Program a which consists of Tabulating at horizontal position 20 of the carriage; inserting a Space at position 52 of the carriage; and energizing the Punch-Off relay at position 90 of the carriage. In this example lines 2 and 3 will be typed in a format specified by Program b which consists of inserting a Space at position 60 of the carriage and energizing the Punch-Off relay at position 90 of the carriage.

In order to place the unit in condition for operating on an automatic program, a ground potential must be placed on the single commutator 1001. This ground potential is obtained through a plurality of mechanical interlocks. The ground potential originates at point 5061 on FIGURE 5 and is connected through the contact 5060 of the Error relay indicating that there has been no error; through the contact 5091 of the Tight Tape contact indicating that the tape in the punch unit is not too tight to facilitate correct operation; through the contact 5090 indicating that the system has been manually placed in the automatic program condition; through the carriage return control contacts 5080 indicating that the carriage return has not been operated; through the Back Space relay contacts 5070 indicating that the back space function has not been initiated; and over lines 5102 and 1502 to the single commutator 1001.

During the typing of the first line, the a Program relay is energized thereby closing all of the a Program relay contacts. The connections established for energizing this relay are as follows: The stepping switch 2010 is in position 1 because line 1 is being typed. Ground potential from the point 5005 is connected through the Carriage Return switch contact 5006, through the homing relay contacts 5007, over line 5201 and 2501 to the stepping switch contact 2011. This ground potential is connected over line 2201 to the terminal 2022. From the terminal 2022 a connection is established to the terminal 2020 and over line 2320 and 3220 to one side of Program relay a. Since ground potential is applied to one side of Program relay a and —165 volts is applied to the other side of Program relay a, the relay is energized closing all of the contacts associated therewith.

During the typing of the first line, when the single commutator 1001 reaches the position 20 on the printed circuit 1000, the ground potential is connected from contact 20, through plug 1011, through isolating neon 1020, over lines 1201 and 2101 to the terminal a in the set of terminals marked TAB in the row of terminals 2001. From this terminal the ground potential is connected over line 2311 and 3211 to one of the contacts of Program relay a.

Since Program relay a is energized the ground potential from the printed circuit contact 20 will be connected from line 3211 through the contact of the a Program relay, over line 3402 and 4302 to the grid of the cold cathode amplifier 4015. This tube is fired, thereby energizing the TAB relay 4016. Ground potential is connected through the contacts to the contact 4018 of the TAB relay to the TAB actuator 4019. This energizes the TAB actuator which performs the tabulating function in the typewriter. Thus, the Tabulate function has been automatically performed at carriage position 20 during the typing of line 1.

Similarly, as the typing proceeds to the point at which the commutator 1001 reaches printed circuit position 52, ground potential is connected through plug 1012, through neon 1021, over line 1203 and 2103, over line 2331 and 3231, through the closed contact of Program relay a, over line 3403 and 4303 to the grid of cold cathode amplifier 4020. The cold cathode amplifier 4020 is fired, thus automatically initiating the Space function at carriage position 52 during the typing of the first line.

When the carriage reaches the position so that the commutator 1001 places ground potential on position 90 in the printed circuit board, the ground potential is transferred through plug 1014, through neon 1023, over line 1205 and 2105, over line 2341 and line 3241, through the closed contact of Program relay a, over line 3406 and 4306 to the grid of cold cathode amplifier 4050, thereby initiating the Punch-Off function.

When the typing of line 1 is completed, a line feed operation is performed so that line 2 may be typed. The contact 2011 of stepping switch 2010 moves to the 2 position. Therefore, ground potential is applied over line 2202, through the terminal 2023 and the terminal 2021 and over lines 2321 and 3221 to energize Program relay b.

During the typing of line 2, when the commutator 1001 places ground potential on the printed circuit terminal 60, this ground potential is transferred through plug 1013, through neon 1022, over line 1204 and 2104, over line 3232, through the closed contact of Program relay b, over line 3403 and 4303 to the grid of cold cathode amplifier 4020. This tube is fired, thereby automatically initiating the Space function at carriage position 60 during the typing of line 2.

Similarly, when the contact 1001 reaches the printed circuit terminal 90, a ground potential is connected through plug 1014, through neon 1024, over line 1206 and 2106, over line 2342 and 3242, through the closed contact of Program relay b, over line 3406 and 4306 to the grid of cold cathode amplifier 4050. The cold cathode amplifier 4050 is fired, thereby initiating the Punch-Off function automatically at position 90 during the typing of line 2.

When the typing of line 2 is completed, a line feed operation occurs, thereby making the typewriter ready to type line 3. The stepping switch contact 2011 moves to position 3, thereby applying ground potential over line 2203, through terminal 2024 and terminal 2021, over the line 2321 and 3221 to energize Program relay b. Thus, the Program b will be performed during the typing of line 3 just as it was performed during the typing of line 2 as described above.

What I claim as new and desire to secure by Letters Patent of the United States is:

1. A carriage programming system for a typewriter-to-code output unit comprising means for producing a first signal indicative of the horizontal position of said carriage, means for producing a second signal indicative of the vertical line position of said typewriter, a plurality of program relays, said second signal being connected to sequentially energize said program relays, a plurality of function relays including relays connected for initiating various carriage horizontal movement functions, and means for connecting said first signal through the contacts of an energized program relay to energize a desired one of said function relays.

2. A system as in claim 1, wherein the carriage movement function relays are connected to provide the functions of non-coded carriage space, tabulation, coded carriage space, and carriage return respectively.

3. A system as in claim 1, wherein the function relays further include relay means connected for initiating punch-on and punch-off functions.

4. A carriage programming system for a typewriter-to-code output system comprising a contact movable horizontally with said carriage, a plurality of fixed horizontally spaced contacts, said movable contact sequentially connecting an energizing potential to different ones of said fixed contacts, a plugboard including a plurality of isolating devices, a stepping switch stepped in accordance with the line feed of said typewriter, a plurality of program relays, said stepping switch being connected to sequentially energize said program relays, a plurality of function relays for initiating desired control functions, said energizing potential being sequentially connected through one of said fixed contacts, through the isolating devices of said plugboard, and through the contacts of an energized program relay to energize a particular function relay.

5. A carriage programming system for a typewriter-to-code output unit comprising a contact movable horizontally with said carriage, a plurality of fixed horizontally spaced contacts, said movable contact selectively applying ground potential to different ones of said fixed contacts, a plugboard including a plurality of first terminals and a plurality of second terminals, a plurality of neon isolating devices, each of said isolating devices being connected between one of said first terminals and one of said second terminals, selected ones of said horizontally spaced contacts being connected to selected ones of said first terminals in accordance with the desired program, a stepping switch movable with the line feed of said typewriter, a plurality of program relays each having a plurality of sets of contacts, said stepping switch being connected to selectively energize said relays, a plurality of function relays for initiating desired control functions, each of said program relays having a set of contacts associated with each of said function relays, said second terminals of said plugboard being connected through the contacts of said program relays in accordance with the desired program, means for connecting the contacts of selected program relays to selected ones of said function relays whereby said function relays are energized when said movable contact is in a specified horizontal position and when said stepping switch is in a specified position in accordance with the desired program.

6. The carriage programming system recited in claim 5 wherein said ground potential is applied to said movable contact through a plurality of interlocks which are actuated only when said typewriter is in a condition to operate on an automatic program.

7. The carriage programming system recited in claim 5 wherein the means connecting the contacts of said program relays to the function relays include a plurality of cold cathode amplifying tubes for energizing each of said function relays.

8. The system recited in claim 5 wherein said typewriter includes a keyboard having manually operable keys and said code output unit includes a plurality of punch magnets for producing said code output, said keyboard being connected to selectively energize said punch magnets in accordance with said code, said function relays being connected to automatically actuate said keys.

9. A carriage programming system for a typewriter-to-code output unit comprising a contact movable horizontally with said carriage, a plurality of fixed horizontally spaced contacts, said movable contact sequentially applying an energizing potential to said fixed contacts, a plugboard including a plurality of first terminals and a plurality of second terminals, a plurality of isolating devices, each of said isolating devices being connected between one of said first terminals and one of said second terminals, selected ones of said horizontally spaced contacts being connected to selected ones of said first terminals in accordance with the desired program, a stepping switch stepped in accordance with the line feed of said typewriter, a plurality of program relays each having a plurality of sets of contacts, said stepping switch being connected to sequentially energize said relays, a plurality of function relays for initiating desired control functions, each of said program relays having a set of contacts associated with each of said function relays, said second terminals of said plugboard being connected through the contacts of said program relays in accordance with the desired program, means for connecting the contacts of selected program relays to selected ones of said function relays whereby said function relays are energized when said movable contact is in a specified horizontal position and when said stepping switch is in a specified position in accordance with the desired program.

10. A system as in claim 9, including reset means for manually causing the stepping switch to proceed to the position corresponding to the first line without the necessity for advancing the line feed.

11. A system as in claim 9, including program suppression means for manually causing continued operation on the same program for a plurality of consecutive lines.

12. A carriage programming system for a typewriter-to-code output system comprising a contact movable horizontally with said carriage, a plurality of fixed horizontally spaced contacts, said movable contact sequentially connecting an energizing potential to different ones of said fixed contacts, a plugboard including a plurality of isolating devices adapted for selectively variable connection of said fixed contacts to one or more of said respective isolating devices, a stepping switch stepped in accordance with the line feed of said typewriter, a plurality of program relays, said stepping switch being connected to sequentially energize said program relays, a plurality of function relays for initiating desired control functions, said energizing potential being sequentially connected through one of said fixed contacts, through the isolating devices of said plugboard, and through the contacts of an energized program relay to energize a particular function relay.

References Cited in the file of this patent
UNITED STATES PATENTS

| | | |
|---|---|---|
| 1,780,610 | Weinlich | Nov. 4, 1930 |
| 2,131,914 | Carroll et al. | Oct. 4, 1938 |
| 2,905,244 | Sonnanstine | Sept. 22, 1959 |
| 2,947,357 | Bafour et al. | Aug. 2, 1960 |
| 2,998,912 | Hagen | Sept. 5, 1961 |
| 3,023,952 | Thomas | Mar. 6, 1962 |